US012688355B2

(12) United States Patent
Zhao et al.

(10) Patent No.: US 12,688,355 B2
(45) Date of Patent: Jul. 21, 2026

(54) DEBIASING PROMPTS IN CONNECTION WITH ARTIFICIAL INTELLIGENCE TECHNIQUES

(71) Applicant: International Business Machines Corporation, Armonk, NY (US)

(72) Inventors: Yang Zhao, Tokyo (JP); Tetsuya Nasukawa, Tokyo (JP); Masayasu Muraoka, Tokyo (JP); Bishwaranjan Bhattacharjee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 18/126,631

(22) Filed: Mar. 27, 2023

(65) Prior Publication Data

US 2024/0330582 A1     Oct. 3, 2024

(51) Int. Cl.
*G06F 40/20* (2020.01)
*G06F 40/40* (2020.01)

(52) U.S. Cl.
CPC .............. *G06F 40/20* (2020.01); *G06F 40/40* (2020.01)

(58) Field of Classification Search
CPC .......... G06F 40/20; G06F 40/40; G06F 16/35; G06F 16/355; G06F 16/353; G06F 40/35; G06F 18/24; G06F 40/169; G06F 2203/011
USPC ..................................................... 704/9, 254
See application file for complete search history.

(56) References Cited

U.S. PATENT DOCUMENTS

| | | | |
|---|---|---|---|
| 11,423,680 B1* | 8/2022 | Jade ...................... | G06F 16/353 |
| 2006/0122834 A1* | 6/2006 | Bennett .............. | G10L 15/1822 |
| | | | 704/E15.047 |
| 2011/0209043 A1 | 8/2011 | Guo et al. | |
| 2017/0004184 A1* | 1/2017 | Jain .......................... | G06F 16/35 |
| 2018/0173698 A1* | 6/2018 | Dubey .............. | G06F 16/3347 |
| 2018/0226071 A1 | 8/2018 | Winter et al. | |
| 2020/0374258 A1* | 11/2020 | Fox ........................ | G06Q 50/01 |
| 2021/0089934 A1* | 3/2021 | Thornley ............... | G06F 40/35 |
| 2021/0174211 A1* | 6/2021 | Macddonald .......... | G06N 3/082 |
| 2023/0121711 A1* | 4/2023 | Chhaya ................... | G06N 3/09 |
| | | | 704/9 |

(Continued)

OTHER PUBLICATIONS

Timo Schick, Sahana Udupa, Hinrich Schütze; Self-Diagnosis and Self-Debiasing: A Proposal for Reducing Corpus-Based Bias in NLP. Transactions of the Association for Computational Linguistics 2021; 9 1408-1424 (Year: 2021).*

(Continued)

*Primary Examiner* — Richemond Dorvil
*Assistant Examiner* — Rodrigo A Chavez
(74) *Attorney, Agent, or Firm* — Ryan, Mason & Lewis, LLP

(57) ABSTRACT

Methods, systems, and computer program products for debiasing prompts in connection with artificial intelligence techniques are provided herein. A computer-implemented method includes extracting multiple utterances from at least one dialogue-related corpus; annotating each of at least a portion of the multiple extracted utterances with a sentiment polarity value; selecting at least a portion of the annotated utterances to be used in training one or more artificial (Continued)

202 — EXTRACT MULTIPLE UTTERANCES FROM AT LEAST ONE DIALOGUE-RELATED CORPUS

204 — ANNOTATE EACH OF AT LEAST A PORTION OF THE MULTIPLE EXTRACTED UTTERANCES WITH A SENTIMENT POLARITY VALUE

206 — SELECT AT LEAST A PORTION OF THE ANNOTATED UTTERANCES TO BE USED IN TRAINING ONE OR MORE ARTIFICIAL INTELLIGENCE TECHNIQUES

208 — PERFORM ONE OR MORE AUTOMATED ACTIONS BASED AT LEAST IN PART ON THE SELECTED ANNOTATED UTTERANCES intelligence techniques; and performing one or more automated actions based at least in part on the selected annotated utterances.

20 Claims, 3 Drawing Sheets

(56) References Cited

U.S. PATENT DOCUMENTS

| | | | | |
|---|---|---|---|---|
| 2024/0303431 A1* | 9/2024 | Annadi | .................. | G06F 40/40 |
| 2024/0311563 A1* | 9/2024 | Somech | ............... | G06F 40/295 |
| 2025/0131201 A1* | 4/2025 | Ullrich | ................... | G06F 40/35 |

OTHER PUBLICATIONS

Michael Mendelson and Yonatan Belinkov. 2021. Debiasing Methods in Natural Language Understanding Make Bias More Accessible. In Proceedings of the 2021 Conference on Empirical Methods in Natural Language Processing, pp. 1545-1557. (Year: 2021).*

Liang, P.P., Li, I.Z., Zheng, E., Lim, Y.C., Salakhutdinov, R., & Morency, L. (2020). Towards Debiasing Sentence Representations. Annual Meeting of the Association for Computational Linguistics. (Year: 2020).*

Xuhui Zhou, Maarten Sap, Swabha Swayamdipta, Yejin Choi, and Noah Smith. 2021. Challenges in Automated Debiasing for Toxic Language Detection. In Proceedings of the 16th Conference of the European Chapter of the Association for Computational Linguistics: Main Volume, pp. 3143-3155. (Year: 2021).*

Christoph Hube, Maximilian Idahl, and Besnik Fetahu. 2020. Debiasing Word Embeddings from Sentiment Associations in Names. In Proceedings of the 13th International Conference on Web Search and Data Mining (WSDM '20). Association for Computing Machinery, New York, NY, USA, 259-267. (Year: 2020).*

Parraga et al., Debiasing Methods for Fairer Neural Models in Vision and Language Research: A Survey, Nov. 10, 2022.

Yang et al., ADEPT: A DEbiasing PrompT Framework, Dec. 23, 2022.

Zhang et al., Differentiable Prompt Makes Pre-Trained Language Models Better Few-Shot Learners, May 4, 2022.

Gao et al., LEGO-ABSA: A Prompt-based Task Assemblable Unified Generative Framework for Multi-task Aspect-based Sentiment Analysis, 2022.

Garg et al., Identifying and Measuring Token-Level Sentiment Bias in Pre-trained Language Models with Prompts, Dec. 23, 2022.

Kokab et al., Transformer-based deep learning models for the sentiment analysis of social media data, May 18, 2022.

Shi et al., ISPY: Automatic Issue-Solution Pair Extraction from Community Live Chats, Sep. 15, 2021.

Devlin et al., BERT: Pre-training of Deep Bidirectional Transformers for Language Understanding, NAACL 2019.

Zhao et al., Calibrate before use: improving few-shot performance of language models, ICML 2021.

Liu et al., Solving Aspect Category Sentiment Analysis as a Text Generation Task, EMNLP 2021.

Liu et al., ROBERTa: A Robustly Optimized BERT Pretraining Approach, arxiv, 2019.

Hu et al., Mining and Summarizing Customer Reviews, KDD 2004.

* cited by examiner

105

ARTIFICIAL INTELLIGENCE
TRAINING CONFIGURATION
SYSTEM

UTTERANCE EXTRACTOR
112

UTTERANCE FREQUENCY-
RELATED DETERMINATION
COMPONENT
114

SENTIMENT POLARITY
ANNOTATOR
116

ARTIFICIAL INTELLIGENCE
TECHNIQUE TRAINING
CONFIGURATOR
118

AUTOMATED ACTION
GENERATOR
120

102

NETWORK
DEVICE(S)

104

NETWORK

106

DIALOGUE
CORPUS

108

WORD LIST
DATABASE

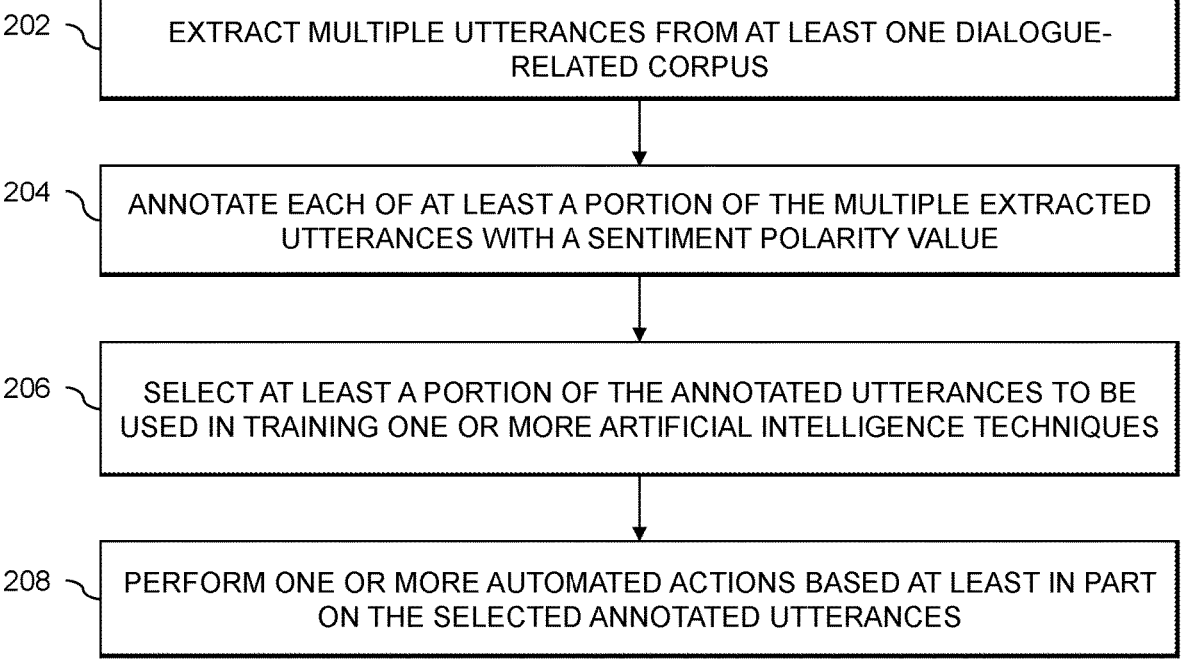

202　EXTRACT MULTIPLE UTTERANCES FROM AT LEAST ONE DIALOGUE-RELATED CORPUS

204　ANNOTATE EACH OF AT LEAST A PORTION OF THE MULTIPLE EXTRACTED UTTERANCES WITH A SENTIMENT POLARITY VALUE

206　SELECT AT LEAST A PORTION OF THE ANNOTATED UTTERANCES TO BE USED IN TRAINING ONE OR MORE ARTIFICIAL INTELLIGENCE TECHNIQUES

208　PERFORM ONE OR MORE AUTOMATED ACTIONS BASED AT LEAST IN PART ON THE SELECTED ANNOTATED UTTERANCES

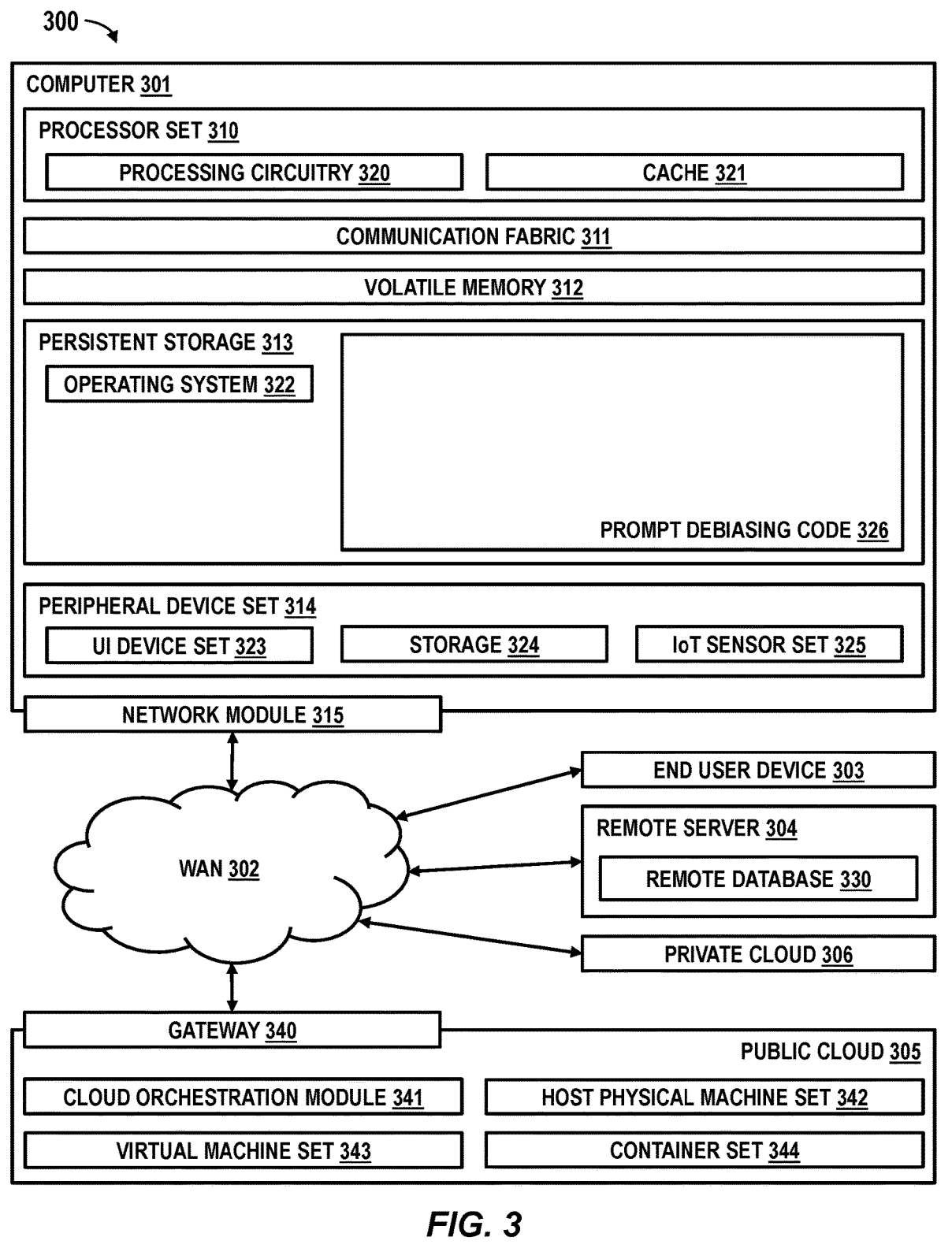

COMPUTER 301

PROCESSOR SET 310

| PROCESSING CIRCUITRY 320 | CACHE 321 |

COMMUNICATION FABRIC 311

VOLATILE MEMORY 312

PERSISTENT STORAGE 313

OPERATING SYSTEM 322

PROMPT DEBIASING CODE 326

PERIPHERAL DEVICE SET 314

| UI DEVICE SET 323 | STORAGE 324 | IoT SENSOR SET 325 |

NETWORK MODULE 315

WAN 302

END USER DEVICE 303

REMOTE SERVER 304

REMOTE DATABASE 330

PRIVATE CLOUD 306

GATEWAY 340

PUBLIC CLOUD 305

| CLOUD ORCHESTRATION MODULE 341 | HOST PHYSICAL MACHINE SET 342 |
| VIRTUAL MACHINE SET 343 | CONTAINER SET 344 |

*FIG. 3*

DEBIASING PROMPTS IN CONNECTION WITH ARTIFICIAL INTELLIGENCE TECHNIQUES

BACKGROUND

The present application generally relates to information technology and, more particularly, to data processing techniques. More specifically, prompts are commonly used to elicit answers from language processing models. However, conventional prompt design approaches typically include resource-intensive techniques which fail to produce consistent results.

SUMMARY

In at least one embodiment, techniques for debiasing prompts in connection with artificial intelligence techniques are provided.

An example computer-implemented method includes extracting multiple utterances from at least one dialogue-related corpus, and annotating each of at least a portion of the multiple extracted utterances with a sentiment polarity value. Additionally, the method also includes selecting at least a portion of the annotated utterances to be used in training one or more artificial intelligence techniques, and performing one or more automated actions based at least in part on the selected annotated utterances.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating techniques according to an example embodiment of the invention; and FIG. 3 is a diagram illustrating a computing environment in which at least one embodiment of the invention can be implemented.

DETAILED DESCRIPTION

Figure 1:
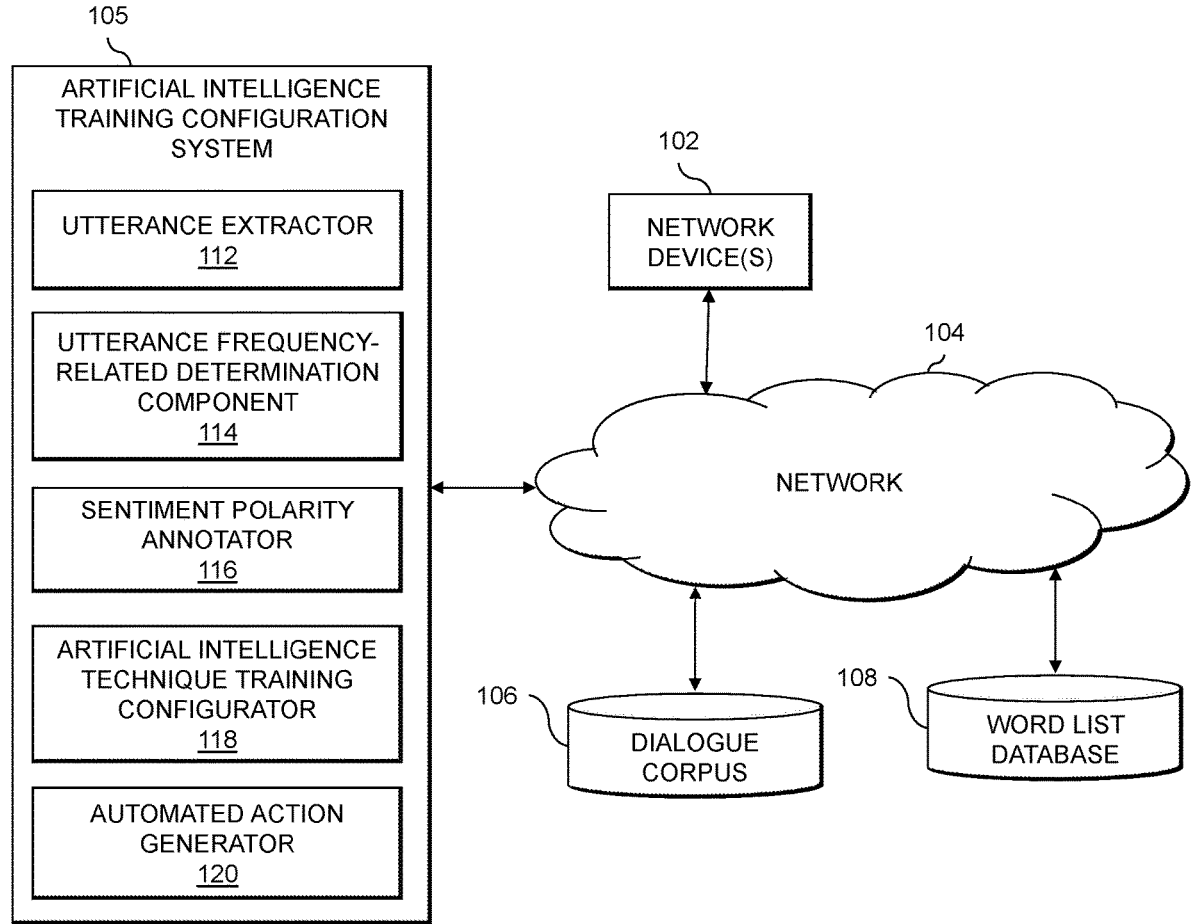
FIG. 1 is a diagram illustrating system architecture in accordance with an example embodiment of the invention.

As described herein, at least one embodiment includes generating and/or implementing debiasing prompt templates for use in connection with one or more artificial intelligence techniques (e.g., one or more foundation models, which can include one or more artificial intelligence models trained on large quantities of unlabeled data at scale) using content-free data. Such an embodiment includes extracting utterances from at least one language-related corpus, each utterance having a frequency associated therewith that is equal to or greater than a predetermined frequency threshold associated with the at least one language-related corpus (e.g., dialogue corpus 106 in the FIG. 1 embodiment). Additionally, such an embodiment includes obtaining and/or reading at least one positive word list and at least one negative word list (e.g., at least one pre-compiled positive word list and at least one pre-compiled negative word list), and tagging each utterance with a sentiment polarity value based at least in part on the number of positive words and the number of negative words (derived from the respective word lists) included in the utterance. In one or more embodiments, the tagging is carried out such that the extracted utterances can be approximately equally divided, to an extent possible, between utterances with positive sentiment polarity tags (e.g., utterances only having positive words or only having positive and neutral words) and utterances with negative sentiment polarity tags (e.g., utterances only having negative words or only having negative and neutral words).

Additionally, at least one embodiment includes training one or more diagonal matrix parameters of an affine transformation for adjusting output probabilities of the given artificial intelligence techniques (e.g., a given foundation model) using at least a portion of the tagged utterances. By way merely of example and illustration, assume a given probability distribution P of output probabilities (p) is represented as $P=[p_1, p_2, p_3]$, and a given set of diagonal matrix parameters (x) is represented as $M=[[x_1, 0, 0], [0, x_2, 0], [0, 0, x_3]]$, which is a 3×3 matrix (M). Accordingly, when probability distribution P is multiplied by matrix M, a new probability distribution P' will be generated and/or determined. Such an embodiment can also include, in connection with such training, selecting a given number of instances (e.g., k instances) for each class of output probabilities of the given artificial intelligence techniques (e.g., the given foundation model) from the tagged utterances. In one or more embodiments, the selection of k instances can be empirical and/or rely on a given minimum number of positive, negative and/or neutral instances. For example, if at least one embodiment includes yielding 120 positive instances, 1700 neutral instances, and 260 negative instances, then k must be smaller than 120.

In one or more embodiments, tagging utterances with sentiment polarity values includes tagging each utterance based at least in part on whether the number of positive words included in the utterance is even or odd, and/or based at least in part on whether the number of negative words included in the utterance is even or odd. By way merely of example and illustration, consider the phrase "it is not illegal", which contains an even number of negation words ("not" and "illegal"), and as such, the phrase expresses a positive sentiment; however, the phrase "it is illegal" contains an odd number of negation words ("illegal") and therefore expresses a negative sentiment.

As also detailed herein, at least one embodiment includes using and/or implementing frequent and/or generic response utterances from at least one dialogue corpus in debiasing artificial intelligence technique training (e.g., neural network layer training) to facilitate and/or ensure effectiveness for cross-domain datasets. Further, in such an embodiment, frequent and/or generic response utterances can be extracted from the at least one dialogue corpus and automatically labeled for further use and/or processing.

One or more embodiments include using information theory techniques (e.g., with respect to one or more language-related frequency effects) to identify and/or select content-free positive, neutral, negative language instances to train one or more diagonal debiasing parameters (W), which can be used to transform a probability distribution over vocabulary in at least a portion of one or more artificial intelligence techniques (e.g., a softmax layer of a neural network). Also, as used herein, content-free refers to language, e.g., a sentence, which, regardless of the context, manifests positive or negative sentiment(s). For example, a sentence such as "I thank you very much" corresponds with a positive sentiment regardless of what the previous sentence was or what the subsequent sentence is.

FIG. 1 is a diagram illustrating system architecture in accordance with an example embodiment of the invention. By way of illustration, FIG. 1 depicts artificial intelligence training configuration system 105, which is connected, via network 104, to network device(s) 102, dialogue corpus 106 and word list database 108. It is also to be appreciated that the elements and configuration thereof depicted in FIG. 1 are merely exemplary, and one or more alternatives can be implemented in one or more embodiments. For example, in such an embodiment, dialogue corpus 106 and word list database 108 can be resident on artificial intelligence training configuration system 105 and/or implemented on the same processing platform as artificial intelligence training configuration system 105.

As also depicted in FIG. 1, artificial intelligence training configuration system 105 includes various elements including utterance extractor 112, utterance frequency-related determination component 114, sentiment polarity annotator 116, artificial intelligence technique training configurator 118, and automated action generator 120. Accordingly, at least one embodiment can include utterance extractor 112 processing data within dialogue corpus (D) 106 and extracting multiple utterances therefrom to form a set of utterances (U). Subsequently, utterance frequency-related determination component 114 determines the frequency ($f_i$) of each utterance ($u_i$) in (and sorts all $u_i$ values by corresponding frequency $f_i$ (e.g., sorts the utterances in descending order such that $f_1 \geq f_2 \geq \ldots \geq f_N$).

Additionally, such an embodiment includes utterance frequency-related determination component 114 determining a frequency threshold (F) and selecting one or more of the utterances (if the one or more utterances have a frequency value $f_i$ that is greater than or equal to F to form a set S. Further, artificial intelligence training configuration system 105 can obtain, from word list database 108, at least one predefined positive word list ($L_{pos}$) and at least one negative word list ($L_{neg}$), and automatically annotating (also referred to herein as tagging), via sentiment polarity annotator 116, each utterance $u_i$ in S with a corresponding sentiment polarity value $t_i$. In one or more embodiments, sentiment polarity values can be determined as follows.

If $u_i$ contains more than one positive word from $L_{pos}$ and no negative words from $L_{neg}$: if the number of negation words is an even number (e.g., 0, 2, 4, 6, 8, etc.), then the $u_i$ is annotated with a $t_i$ of "positive;" if the number of negation words is an odd number (e.g., 1, 3, 5, 7, 9, etc.), then the $u_i$ is annotated with a $t_i$ of "negative." As used herein, negation words can include contradiction-related and/or nullification-related words such as "never," "no one," "nobody," "none," "nor," "nothing," etc., while negative words can include words detailing an undesirable quality and/or an absence or limited amount of a desirable quality such as "dishonest," "disappointed," etc.

Alternatively, if $u_i$ contains no positive word from list $L_{pos}$ and more than one negative word from list $L_{neg}$: if the number of negation words is an even number, then the $u_i$ is annotated with a $t_i$ of "negative;" if the number of negation words is an odd number, then the $u_i$ is annotated with a $t_i$ of "positive."

Also, if $u_i$ contains no positive word from $L_{pos}$ and no negative word from $L_{neg}$, then the $u_i$ is annotated with a $t_i$ of "neutral."

Further, referring again to FIG. 1, artificial intelligence technique training configurator 118 can select k instances of each class ($u_i$, $t_i$) to train one or more artificial intelligence techniques. As detailed above, the selection of k instances can be based at least in part on the minimum number of positive, negative and/or neutral instances. By way merely of example, such k instances can be used to train at least one diagonal matrix parameter W associated with at least one natural language processing model, with b=0 (fixed), wherein b represents a trainable parameter of the at least one natural language processing model.

One or more embodiments can also include implementing automated action generator 120 to initiate and/or performing one or more automated actions such as, for example, automatically training one or more artificial intelligence techniques in accordance with the selections made by artificial intelligence technique training configurator 118 and executing the trained artificial intelligence technique(s) on one or more input datasets associated with network device(s) 102 (e.g., one or more input queries submitted by network device(s) 102) and/or debiasing one or more prompts in connection with artificial intelligence technique processing tasks associated with network device(s) 102.

At least one embodiment of the present invention may provide a beneficial effect such as, for example, automatically generating data for debiasing training via a content-free data method coupled with a rule-based sentiment annotation schema.

FIG. 2 is a flow diagram illustrating techniques according to an embodiment of the present invention. Step 202 includes extracting multiple utterances from at least one dialogue-related corpus. At least one embodiment also includes determining a frequency value for each of the multiple extracted utterances, wherein the frequency value corresponds to frequency of the extracted utterance in the at least one dialogue-related corpus. In such an embodiment, extracting multiple utterances includes filtering at least a portion of the multiple utterances based at least in part on the determined frequency values.

Step 204 includes annotating each of at least a portion of the multiple extracted utterances with a sentiment polarity value. In one or more embodiments, annotating each of at least a portion of the multiple extracted utterances with a sentiment polarity value includes determining the sentiment polarity value corresponding to each of the at least a portion of the multiple extracted utterances based at least in part on one or more of a number of predefined positive words and a number of predefined negative words included in the utterance. In such an embodiment, determining the sentiment polarity value corresponding to each of the at least a portion of the multiple extracted utterances can include comparing at least one predefined positive word list and at least one predefined negative word list to each of the at least a portion of the multiple extracted utterances.

Also, in such an embodiment, annotating each of at least a portion of the multiple extracted utterances with a sentiment polarity value can include annotating each of at least a portion of the multiple extracted utterances containing at least one of the predefined positive words and none of the predefined negative words with a positive sentiment polarity value. Additionally or alternatively, annotating each of at least a portion of the multiple extracted utterances with a sentiment polarity value can include annotating each of at least a portion of the multiple extracted utterances containing at least one of the predefined negative words and none of the predefined positive words with a negative sentiment polarity value. Further, in such an embodiment, annotating each of at least a portion of the multiple extracted utterances with a sentiment polarity value can include annotating each of at least a portion of the multiple extracted utterances containing none of the predefined negative words and none of the predefined positive words with a neutral sentiment polarity value.

Step 206 includes selecting at least a portion of the annotated utterances to be used in training one or more artificial intelligence techniques. Step 208 includes performing one or more automated actions based at least in part on the selected annotated utterances. In at least one embodiment, performing one or more automated actions includes automatically training at least one of the one or more artificial intelligence techniques using the at least a portion of the annotated utterances. In such an embodiment, automatically training at least one of the one or more artificial intelligence techniques can include automatically training one or more diagonal matrix parameters for adjusting one or more output probabilities of the at least one artificial intelligence technique.

Further, in at least one embodiment, adjusting one or more output probabilities of the at least one artificial intelligence technique can include debiasing at least one prompt template for the at least one artificial intelligence technique. Additionally or alternatively, performing one or more automated actions can include automatically processing at least a portion of one or more input queries using the at least one trained artificial intelligence technique.

Also, in one or more embodiments, software implementing the techniques depicted in FIG. 2 can be provided as a service in a cloud environment.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as prompt debiasing code 326. In addition to code 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and code 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/ or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in code 326 in persistent storage 313.

Communication fabric 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type RAM or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a ROM, but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in code 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

In computing environment 300, computer 301 is shown as being connected to the internet (see WAN 302). However, in many embodiments of the present invention computer 301 will be isolated from communicating over communications network and not connected to the internet, running as a standalone computer. In these embodiments, network module 315 of computer 301 may not be necessary or even desirable in order to ensure isolation and to prevent external communications coming into computer 301. The standalone computer embodiments are potentially advantageous, at least in some applications of the present invention, because they are typically more secure. In other embodiments, computer 301 is connected to a secure WAN or a secure LAN instead of WAN 302 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a memory configured to store program instructions; and a processor operatively coupled to the memory to execute the program instructions to:

extract multiple utterances from at least one dialogue-related corpus;

annotate each of at least a portion of the multiple extracted utterances with a sentiment polarity value;

select at least a portion of the annotated utterances to be used in training one or more artificial intelligence techniques; and perform one or more automated actions based at least in part on the selected annotated utterances, wherein performing one or more automated actions comprises automatically training at least one of the one or more artificial intelligence techniques using at least a portion of the selected annotated utterances, and wherein automatically training comprises automatically training one or more diagonal matrix parameters of at least one affine transformation for adjusting one or more output probabilities of the at least one artificial intelligence technique.

2. The system of claim 1, wherein the processor is further operatively coupled to the memory to execute the program instructions to:

determine a frequency value for each of the multiple extracted utterances, wherein the frequency value corresponds to frequency of the extracted utterance in the at least one dialogue-related corpus.

3. The system of claim 2, wherein extracting multiple utterances comprises filtering at least a portion of the multiple utterances based at least in part on the determined frequency values.

4. The system of claim 1, wherein annotating each of at least a portion of the multiple extracted utterances with a sentiment polarity value comprises determining the sentiment polarity value corresponding to each of the at least a portion of the multiple extracted utterances based at least in part on one or more of a number of predefined positive words and a number of predefined negative words included in the utterance.

5. The system of claim 4, wherein determining the sentiment polarity value corresponding to each of the at least a portion of the multiple extracted utterances comprises comparing at least one predefined positive word list and at least one predefined negative word list to each of the at least a portion of the multiple extracted utterances.

6. The system of claim 4, wherein annotating each of at least a portion of the multiple extracted utterances with a sentiment polarity value comprises annotating each of at least a portion of the multiple extracted utterances containing at least one of the predefined positive words and none of the predefined negative words with a positive sentiment polarity value.

7. The system of claim 4, wherein annotating each of at least a portion of the multiple extracted utterances with a sentiment polarity value comprises annotating each of at least a portion of the multiple extracted utterances containing at least one of the predefined negative words and none of the predefined positive words with a negative sentiment polarity value.

8. The system of claim 4, wherein annotating each of at least a portion of the multiple extracted utterances with a sentiment polarity value comprises annotating each of at least a portion of the multiple extracted utterances containing none of the predefined negative words and none of the predefined positive words with a neutral sentiment polarity value.

9. The system of claim 1, wherein adjusting one or more output probabilities of the at least one artificial intelligence technique comprises debiasing at least one prompt template for the at least one artificial intelligence technique.

10. The system of claim 1, wherein performing one or more automated actions comprises automatically processing at least a portion of one or more input queries using the at least one trained artificial intelligence technique.

11. A computer program product comprising a computer readable storage medium having program instructions embodied therewith, the program instructions executable by a computing device to cause the computing device to:

extract multiple utterances from at least one dialogue-related corpus;

annotate each of at least a portion of the multiple extracted utterances with a sentiment polarity value;

select at least a portion of the annotated utterances to be used in training one or more artificial intelligence techniques; and perform one or more automated actions based at least in part on the selected annotated utterances, wherein performing one or more automated actions comprises automatically training at least one of the one or more artificial intelligence techniques using at least a portion of the selected annotated utterances, and wherein automatically training comprises automatically training one or more diagonal matrix parameters of at least one affine transformation for adjusting one or more output probabilities of the at least one artificial intelligence technique.

12. The computer program product of claim 11, wherein annotating each of at least a portion of the multiple extracted utterances with a sentiment polarity value comprises determining the sentiment polarity value corresponding to each of the at least a portion of the multiple extracted utterances based at least in part on one or more of a number of predefined positive words and a number of predefined negative words included in the utterance.

13. A computer-implemented method comprising:

extracting multiple utterances from at least one dialogue-related corpus;

annotating each of at least a portion of the multiple extracted utterances with a sentiment polarity value;

selecting at least a portion of the annotated utterances to be used in training one or more artificial intelligence techniques; and performing one or more automated actions based at least in part on the selected annotated utterances, wherein performing one or more automated actions comprises automatically training at least one of the one or more artificial intelligence techniques using at least a portion of the selected annotated utterances, and wherein automatically training comprises automatically training one or more diagonal matrix parameters of at least one affine transformation for adjusting one or more output probabilities of the at least one artificial intelligence technique;

wherein the method is carried out by at least one computing device.

14. The computer-implemented method of claim 13, wherein software implementing the method is provided as a service in a cloud environment.

15. The computer-implemented method of claim 13, further comprising:

determining a frequency value for each of the multiple extracted utterances, wherein the frequency value corresponds to frequency of the extracted utterance in the at least one dialogue-related corpus.

16. The computer-implemented method of claim 13, wherein annotating each of at least a portion of the multiple extracted utterances with a sentiment polarity value comprises determining the sentiment polarity value corresponding to each of the at least a portion of the multiple extracted utterances based at least in part on one or more of a number of predefined positive words and a number of predefined negative words included in the utterance.

17. The computer-implemented method of claim 16, wherein determining the sentiment polarity value corresponding to each of the at least a portion of the multiple extracted utterances comprises comparing at least one predefined positive word list and at least one predefined negative word list to each of the at least a portion of the multiple extracted utterances.

18. The computer-implemented method of claim 16, wherein annotating each of at least a portion of the multiple extracted utterances with a sentiment polarity value comprises annotating each of at least a portion of the multiple extracted utterances containing at least one of the predefined positive words and none of the predefined negative words with a positive sentiment polarity value.

19. The computer-implemented method of claim 16, wherein annotating each of at least a portion of the multiple extracted utterances with a sentiment polarity value comprises annotating each of at least a portion of the multiple extracted utterances containing at least one of the predefined negative words and none of the predefined positive words with a negative sentiment polarity value.

20. The computer-implemented method of claim 16, wherein annotating each of at least a portion of the multiple extracted utterances with a sentiment polarity value comprises annotating each of at least a portion of the multiple extracted utterances containing none of the predefined negative words and none of the predefined positive words with a neutral sentiment polarity value.

* * * * *